United States Patent [19]

Bénac et al.

[11] 4,112,657

[45] Sep. 12, 1978

[54] BEATER FOR A GRAPE HARVESTING MACHINE, AS WELL AS GRAPE HARVESTING MACHINES PROVIDED WITH SUCH A BEATER

[76] Inventors: Bernard Henri Jean Bénac; Jacques Marie Lucien Bénac; Henri Bénac, all of Berdoues par Mirande (Gers), France

[21] Appl. No.: 664,003

[22] Filed: Mar. 4, 1976

[30] Foreign Application Priority Data

Mar. 7, 1975 [FR] France .................. 75 07302
Feb. 24, 1976 [FR] France .................. 76 05100

[51] Int. Cl.² ........................................... A01D 46/00
[52] U.S. Cl. .................................... 56/330; 56/12.5; 56/DIG. 19
[58] Field of Search .............. 56/330, 331, 328 R, 56/130, 12.4, 12.5, DIG. 19

[56] References Cited

U.S. PATENT DOCUMENTS

| 3,021,661 | 2/1962 | Couberly | 56/328 R |
| 3,613,343 | 10/1971 | Sagouspe et al. | 56/330 |
| 3,826,350 | 7/1974 | Fowler et al. | 56/12.5 X |
| 3,901,005 | 8/1975 | Rohrbach et al. | 56/330 |
| 3,939,629 | 2/1976 | Bruel | 56/330 |

Primary Examiner—Jay N. Eskovitz
Attorney, Agent, or Firm—Mason, Fenwick & Lawrence

[57] ABSTRACT

The present invention relates to a beater for a grape harvesting machine in the form of an elongated body placed laterally to the rows of vines, and being driven in a substantially circular movement and moving on one hand, transversally, and on the other, parallel to the rows of vines, as the machine moves forward along a row, which beater is characterized in that it is made of resilient material and is deformable longitudinally.

10 Claims, 23 Drawing Figures

BEATER FOR A GRAPE HARVESTING MACHINE, AS WELL AS GRAPE HARVESTING MACHINES PROVIDED WITH SUCH A BEATER

The subject of the invention is a beater for a grape harvesting machine which, by mechanical means, detaches the grapes that hang in bunches on the plants consisting of vine stocks standing in rows. It relates also to a grape harvesting machine as such which can be harnessed to a tractor to enable the grapes to be harvested mechanically, as the tractor moves along the rows.

Machines enabling individual grapes to be detached from vines in vineyards already exist. In these known machines, the operation is carried out by striking the sides of the rows of vines with the rounded heads of thousands of needles moving to and fro transversally with respect to a vertical plane containing the aligned vine stocks, which plane, for the sake of simplicity, will hereinafter be designated as the "vine stock plane".

These machines have the disadvantage of being complex in the sense that they require a battery of needles in sufficiently large numbers and close to one another so that no grape escapes their point impacts. Moreover, to avoid these needles breaking when they encounter an obstacle, such as a branch, vine stock or stake, it is necessary to cover them with an elastic material which dampens the shocks which complicates their construction and increases the cost of the assembly, without however, ensuring that the vine stocks and support stakes are not damaged.

Machines are also known in which the needles, instead of being driven solely in a to and fro movement transversal to the rows of vines also make a slight longitudinal movement in order to penetrate the rows of vines and extract themselves from these more easily.

In these constructions, the needle which ends in a steel or fiber glass rod is mounted, through a coupling, onto a crank shaft to give it a transversal movement, while a pivoting arm is mounted through a coupling onto each needle at a point on its length to give it its longitudinal movement with respect to the row of vine. However, these machines, which are bulky, do not enable the grapes to be removed from their bunch satisfactorily, since in particular the longitudinal movement of the needle is much too slow to act effectively on the bunch of grapes, while the transversal movement is too rapid to enable penetration of the row of vines to take place without breaking or damaging branches or stakes.

The object of the present invention is to overcome these disadvantages by providing a new beater and a new method for harvesting grapes on vine stocks, as well as a carriage for the application of this method, of a simpler and more robust design, a lower manufacturing cost and having an efficiency which is greater than that hitherto obtained.

The object is attained in that the beater according to the invention consists of a beater of a width preferably equivalent to that of at least one grape that is to be picked — in particular equal to that of two or three adjacent grapes — and:

having a fairly rough edge to catch the grapes without substantially hurting them, when said beater is bearing and moving rapidly against a bunch of grapes;

having sufficient rigidity and elasticity to pull the grapes from their branches without substantially bursting them during this operation, being capable of deforming axially in order not to damage the vine plants or the support stakes.

Thus the grapes are not detached from their stalks as a result of a point impact transversal with respect to the vine stock plane, as in the case of the previously known machine, but the sudden "sweep", like a sudden stroke, obtained with the beater.

It will be understood that on account of this, at each movement of the beater with the rough edge, many grapes will be "pulled off" from their stalks. The number of grapes thus detached by the beater of the invention is far greater than that detached by the known needles.

In addition, because of the intrinsic elasticity of the beater, there is no need to provide special means for protecting it from shocks caused by encounters with a branch, a vine stock or a stake. The beater deforms in particular simply longitudinally and reassumes its original profile as soon as it is no longer against an obstacle. As was seen above, it is important that the material constituting the beater is both rigid and elastic in order, on one hand, to pick the grapes, and, on the other hand, to give way to an obstacle.

The method according to invention consists in detaching grapes by a succession of cyclic movements of the beater described herein above during which the beater, operated by one of its extremities outside the row of vines:

is introduced, by its free extremity, into the interior of the plant in a direction substantially perpendicular to the vine stock plane, with a view to bringing it against the bunches of grapes to be harvested, it is then moved nearly parallel to the vine stock plane, in order to "sweep" the space occupied by the bunches of grapes and "pull off" the grapes from their stalk;

and finally, retract to their initial state but having moved along the plants, in a movement converse to that of the first movement of the cycle.

Preferably, the bunches of grapes must be "swept" suddenly and rapidly, it being necessary for the introducing and withdrawal movements themselves also being as rapid as possible.

More precisely, during its cyclic movement, the beater can be driven at a variable speed, said speed passing though maxima during the sweeping phase and minima at the beginning of the introduction phase and at the end of the withdrawal phase.

In a preferred embodiment, the sudden and rapid movement is effected downward. It is also possible to make this movement in an appreciably horizontal plane. In that case, however, when a plurality of beaters are operated in parallel, it is desirable to use two series of beaters in opposite directions, one after the other. It is envisaged, in fact, that in the case of horizontal movement, the grapes are protected from the beater by an obstacle such as a branch, vine stock or stake, and thus cannot be beaten. It is important therefore that at least one of the beaters should give its sudden stroke in a direction opposite to that of the others.

As stated above, the present invention relates also to a carriage which can be harnessed to a tractor and enable grapes to be harvested automatically by the application of this method during the progression of the tractor along the rows of plants.

This carriage, according to the invention, comprises:
a chassis,
a crankshaft,
  with bearings engaged with the chassis,
  with its axis parallel to the vins stock plane,
  and fitted with means enabling it to be driven rotatively,
an arm, transversal with respect to the vine stock plane,
  able to oscillate about an axle, integral with the chasis
and parallel with that of a crankshaft and slide upon itself,
  arranged to remain bearing on the excentric crank pin of the crankshaft,
  terminated, on the exposed side of the plants, by the beater to be operated,
said arm, in addition, being sufficiently long, on the beater side, for its corresponding extremity to move close to the structure of the carriage,
and said beater being sufficiently long to penetrate deeply into the vine.

The carriage can preferably comprise a plurality of crankshafts coupled to one another on the same shaft which, when the carriage is in a working position, is located opposite the side of the row of vines.

Several shafts of crankshafts can be arranged in a battery in a plane parallel to the vine stock plane. Thus the side of the row of vines is subjected over its entire height and over certain length to the action of beaters actuated by the crankshafts.

In order to prevent any possible irregularity in the profile of the rows of vines, or possible deviations of the tractor, adversely affecting the quality of the grape harvest, it is advantageous to mount the chassis on a support enabling it, when in a working position, to make a transversal rolling movement.

In addition, in order to compensate for the inclination of the tractor, in the case of the vineyard being on a slope, the chassis can be mounted on an inclinable chassis so as to straighten it with respect to the ground.

The simplest embodiment of the carriage according to the invention is constituted by two chassis:
placed on both sides of the row of vines,
each comprising, opposite the vine, a battery of crankshafts whose axles are parallel to one another, by upper cross-pieces passing over the vine.

Other characteristics and advantages of the invention will transpire from the description which follows, with reference to the attached drawings, in which:

FIG. 8 shows, in perspective, the means of harnessing a tractor to the carriage straddling FIG. 7a;

FIG. 15 is an elevation of an operating arm provided with its vane or beater;

FIG. 16 is an elevation of the vane;

FIGS. 17 and 18 show two forms which can be assumed by the vane during its work in the rows of vines.

Figure 1A:
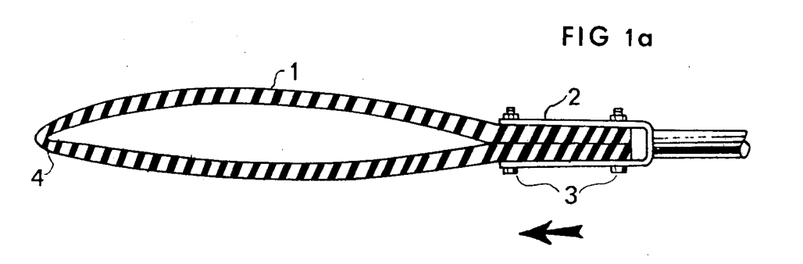
FIGS. 1a and 1b illustrate respectively, a longitudinal section of a beater according to the invention and the deformation of the latter when abutted against a vine stock.

If reference is made first of all to FIG. 1a, one sees a beater 1 formed of a strap folded over itself and whose two free extremities are maintained tightly against one another by a stirrup 2 and bolts 3.

At the elbow 4 formed by the strap, the latter is slightly weakened to enable it to be bent and increase the elasticity of the beater at that point. As was stated above, it is important that the straps should have both sufficient rigidity and elasticity to remove the grapes from their stalks and to give way to an obstacle. Fabric-reinforced rubber has the required characteristics and can be selected for their fabrication. The beaters can therefore be cut out from a type of rubber used for making conveyor belts, straps, etc.

Figure 1B:
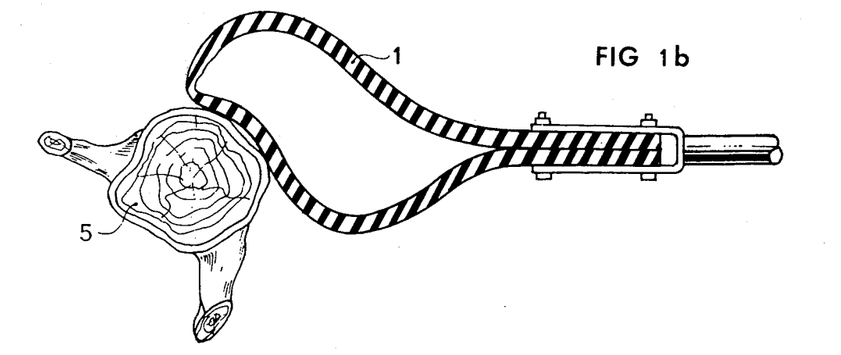

FIG. 1b shows the deformation of a beater 1 when it strikes an obstacle such as a vine stock 5, shown in cross section.

Figure 2:
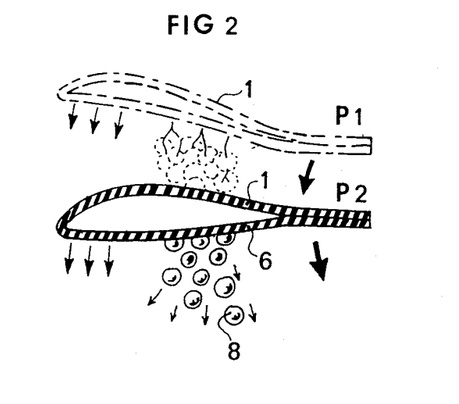
FIGS. 2 and 3 represent respectively the harvesting operation in longitudinal section and in transversal section.
Figure 3:
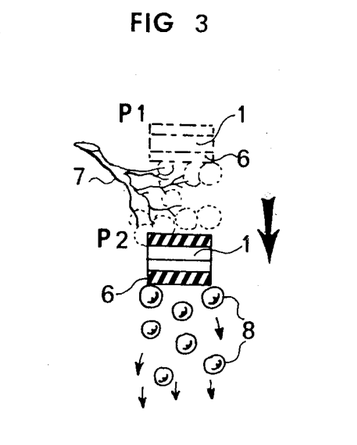

FIGS. 2 and 3 illustrate the basic harvesting operation: the grapes are "pulled off" by a sudden and rapid movement of the beater 1, from the position P1 bearing against the grape (shown in a broken line) to the position P2 (shown in a thick line). In its passage, the edges 6 of the beater "catch" the bunch of grapes 7 from which the grapes 8 become detached and fall.

For these edges have a relatively angular and rough structure due to the shape and the material constituting the beater. At the end of the beater's course, the grapes have been pulled off in the area beaten by the beater. These grapes are not damaged too much because of the elasticity of the beater and can be recovered in a traditional collector.

Figure 4A:
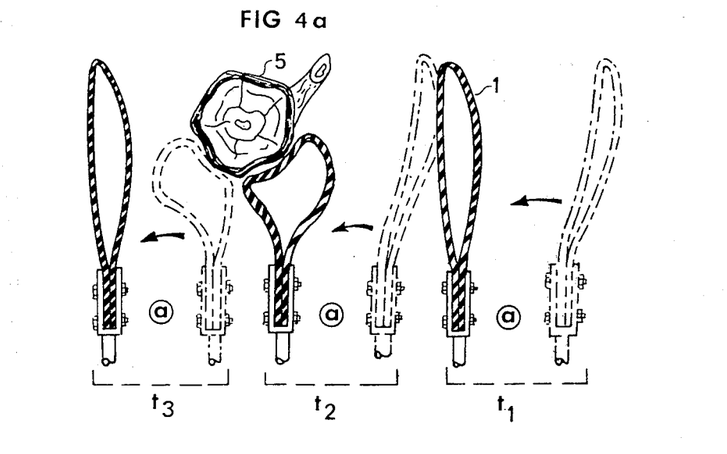
FIGS. 4a and 4b show several "sweeping" beaters operating horizontally in opposite directions.

The sudden and rapid movement from the position P1 to the position P2 can be effected downward or horizontally. In the latter case, in order to avoid an obstacle such as a vine stock 5 preventing the removal of grapes from part of the vine, it is desirable to use the beaters working in opposite directions. This is illustrated in FIGS. 4a and 4b. If only one beater were provided such as $a$ of which FIG. 4a shows the areas that are swept in the direction of the arrows during three successive beatings $t_1$, $t_2$, $s_3$, the hatched part, situated behind the vine stock 5, would not be reached.

On the other hand, in FIG. 4b, one sees the simultaneous action of a pair of beaters working respectively at $a_1$ and $b_1$ in a first beating movement, and then at $a_2$ and $b_2$ in a movement that takes place subsequently. The areas swept by the two beaters $a$ and $b$ operating in opposite directions during the successive beatings $t_1$ and $t_2$ deal with the part that has previously not been covered.

Figure 4B:
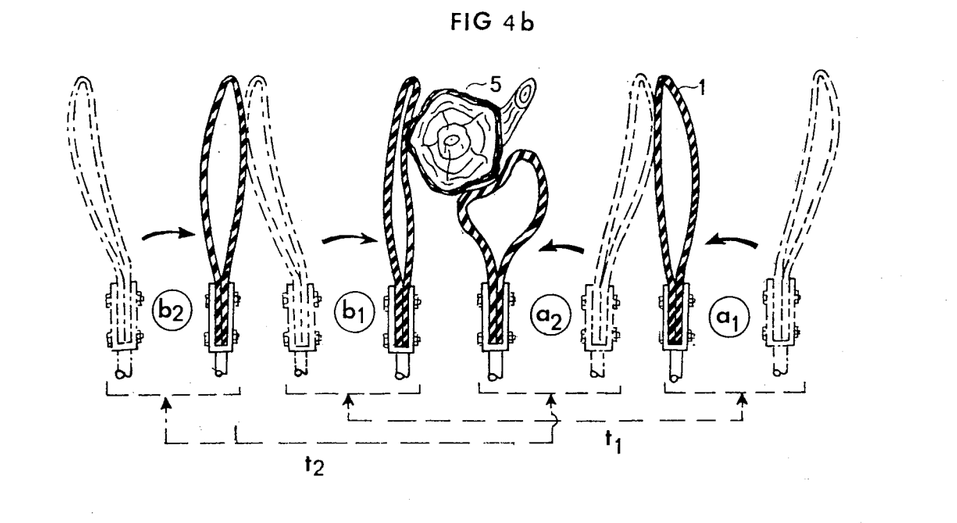
Figure 5:
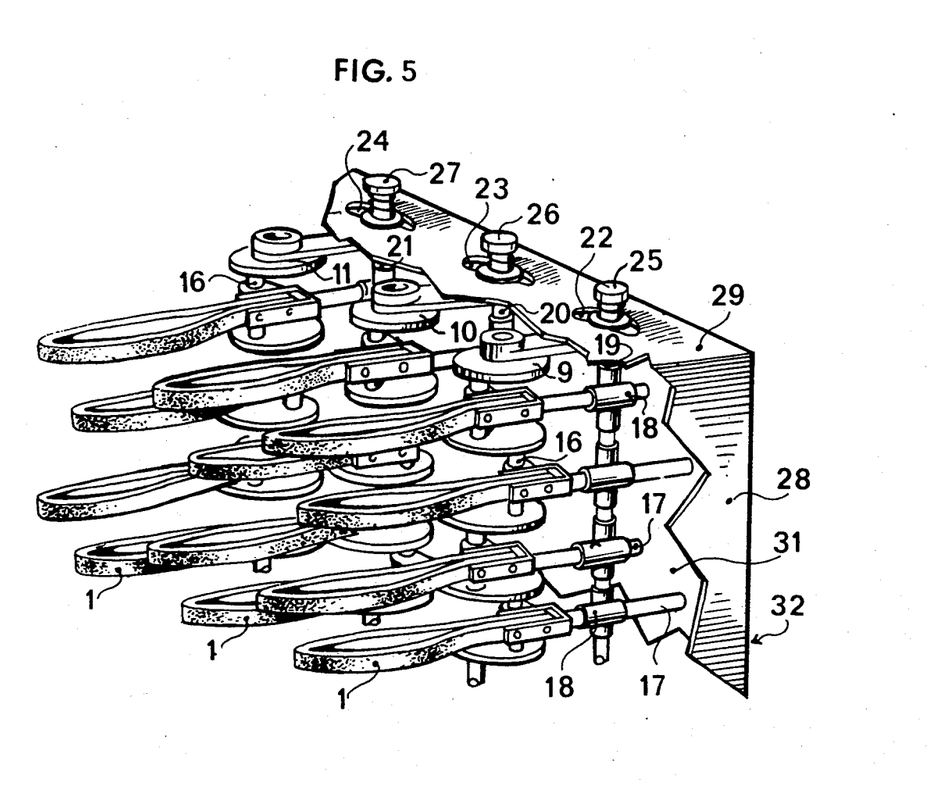
FIG. 5 shows a first embodiment of the chassis on which the beaters are mounted.

A harvesting chassis, with a horizontal section, applying the information supplied in FIG. 4b, is shown in detail in FIG. 5.

The assembly 32 comprises lateral walls 28, top walls and base walls 30 and a posterior wall 31 delimiting a parallelepipedic unit which encloses three series of crankshafts 9, 10 and 11, with bearings engaged with the upper and lower walls of said unit and whose shafts are driven by chain transmission, from a control shaft connected by transmission to the power take-off of a tractor. This transmission will be described later.

Each of the crank pins 16 of the crankshafts actuates a beater 1 fixed at the extremity of an oscillating arm 17 which, on one hand, bears on the crank pins 16 and, on the other, can slide in a sleeve 18 mounted orientably on a vertical shaft 19.

The shaft 19 is common to all the sleeves receiving the arms 17 cooperating with the crankshaft 9. The same applies to the vertical shafts 20 and 21 with regard to the crankshafts 10 and 11.

Figure 6A:
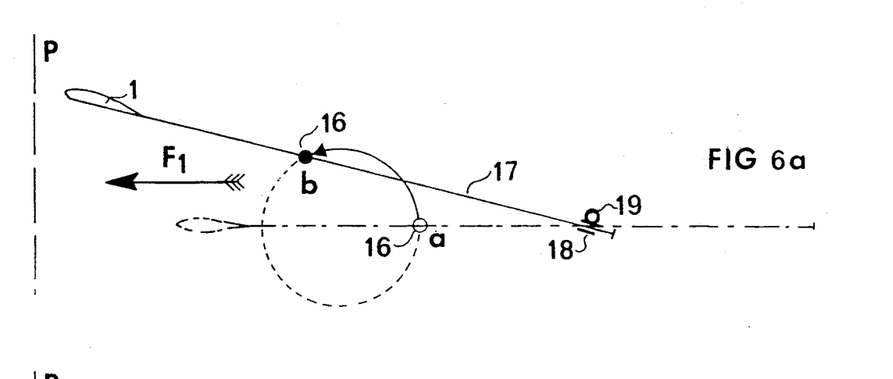
FIGS. 6a, 6b and 6c show schematically the variation of the speed of the beater during its cyclic movement.
Figure 6B:
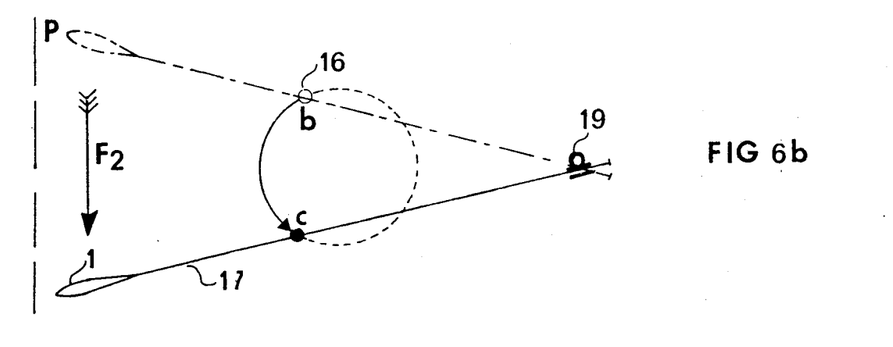

FIGS. 6a and 6b schematically show the movement of the arm 17, and thus of the beater 1, in accordance with the position of the crank pin 16 of the crankshaft. They show that this movement is executed at a uniform speed.

In FIG. 6a, which shows the first phase of the cyclic movement of the beater — the phase in which the beater is introduced into the vine — the crank pin 16 moves from its initial position a to a position b, according to the sagitta of an arc of a circle. It imparts a movement to the beater which at first is accelerated and then slightly retarded, and on average rapid in a direction perpendicular to the vine stock plane P; this is illustrated by the arrow F1.

In FIG. 6b, which represents the second phase of the cycle — the sweeping phase — the crank pin moves from the position b to the position c, transmitting to the beater a movement:
  substantially parallel to the vine stock plane P,
  and sudden, since the movement was already initiated at the beginning of the phase,
  and very rapid, as the result of the amplitude of the movement during this phase.

This movement is symbolised by the arrow F2.

Figure 6C:
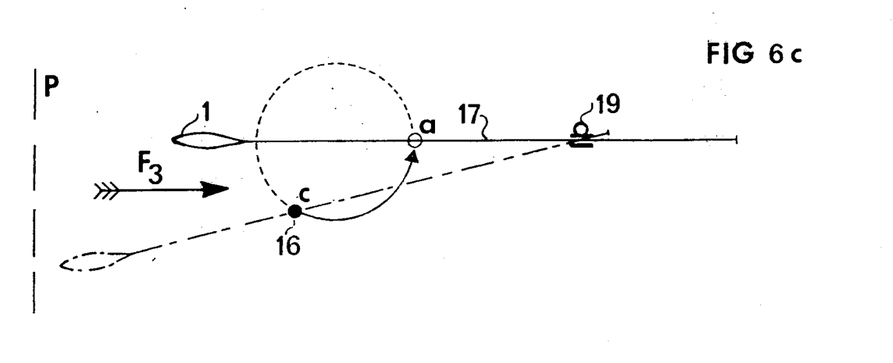

In FIG. 6c, lastly, which shows the third and last phase of the cycle — the withdrawal phase — the crank pin 16 retracts from the position c to the initial position a. It then transmits to the beater a movement which at first is slightly accelerated and then retarded, and on average rapid in a direction perpendicular to the vine stock plane P (arrow F3).

The speed of the beater is at a minimum at the end of the third phase and at the beginning of the first phase; it becomes nil at the point a which corresponds to the extreme retraction point of the beater.

It is obvious that the extent of the different accelerations and descelerations of the beater depend on the relative position of the vertical shaft 19 and the center of the circle, i.e., the longitudinal axis of the crankshaft.

To this end, as FIG. 5 shows, the extremity of the vertical shafts 19, 20 and 21 passes into an opening, respectively 22, 23 and 24, inside which it is possible, by means of a suitable device respectively 25, 26 and 27, to move them parallel to one another and to immobilise them in a chosen position.

Lastly, it is evident that the oscillating movement of the arms 17 is not appreciably modified by whether the vertical shafts 19 to 21 are located at the rear of the shafts of the crankshafts, as is the case in FIG. 5, or, on the contrary, in front of these latter, with respect to the rows of vines.

Figures 7A, 7B:
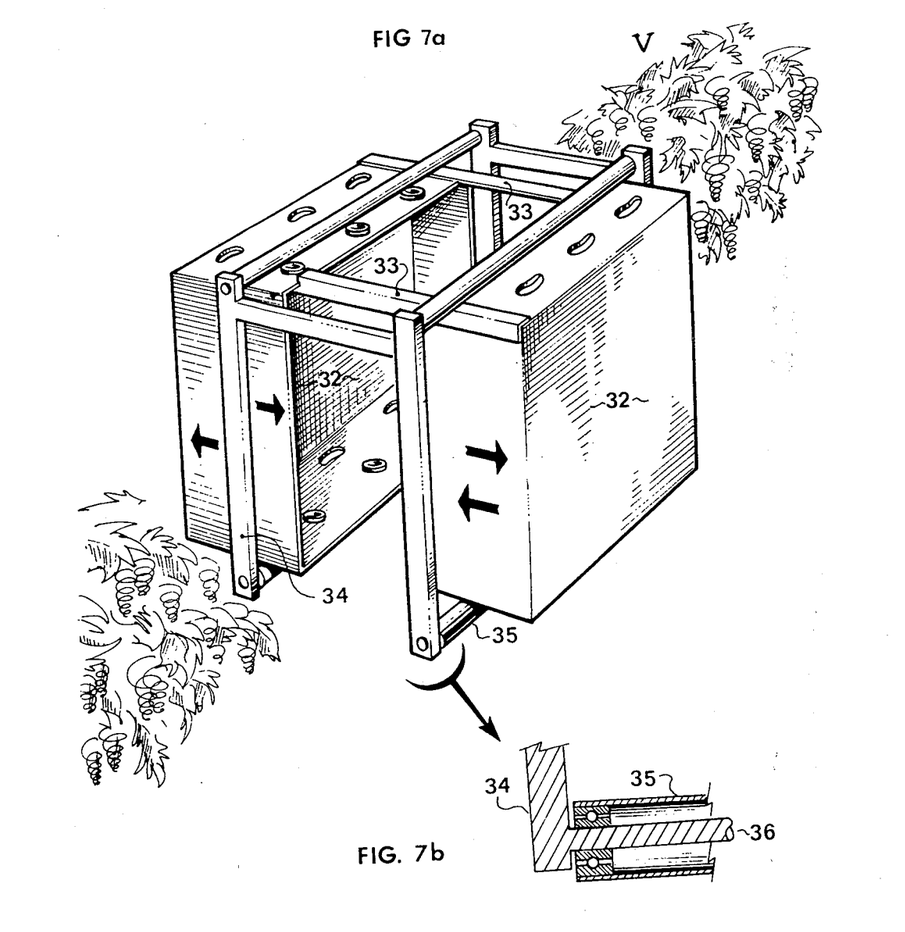
FIG. 7a shows, in perspective, a carriage with two chassis mounted on both sides of a row of vines.
FIG. 7b is a longitudinal section of a roller supporting these chassis.
Figure 8:
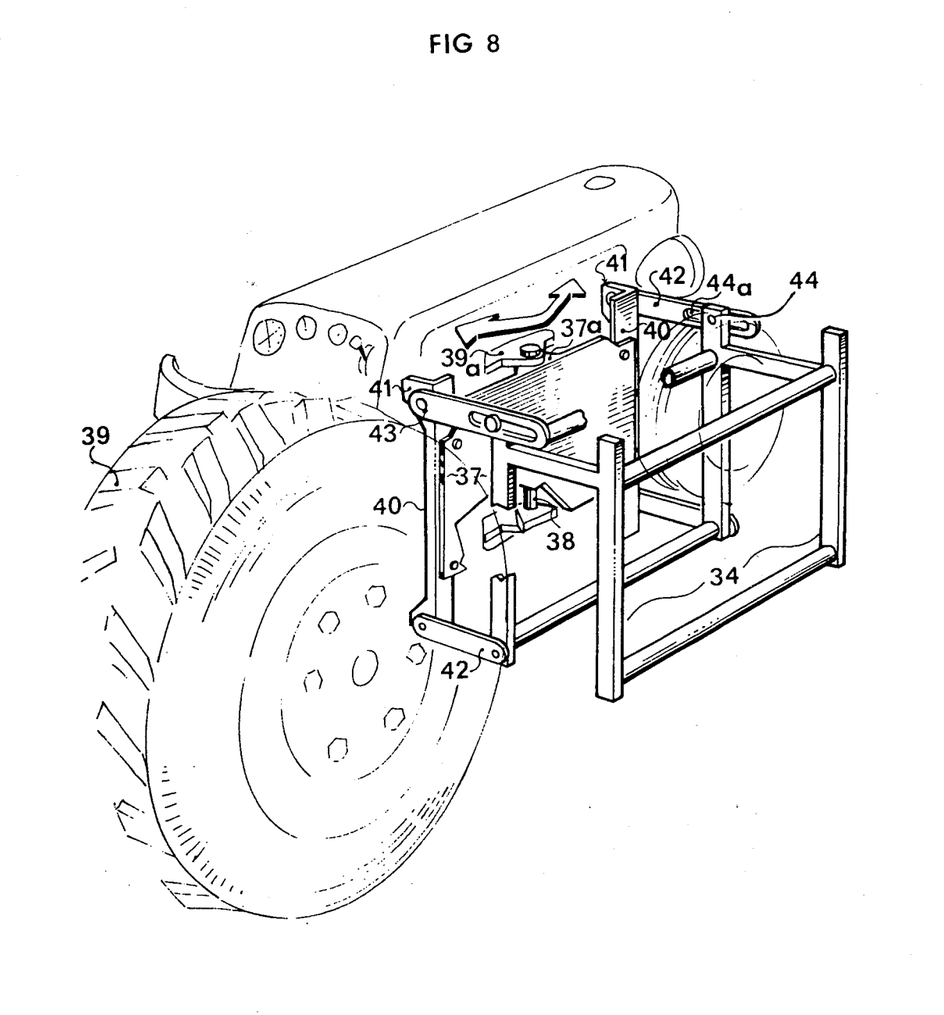

A harvesting carriage, shown in FIGS. 7 and 8, essentially comprises two chassis facing each other so as to be placed on both sides of a row of vines and mounted between the cross pieces of a double transporter 35 straddling the vine V, said transporter being connected to a carrying tractor.

As shown in FIG. 7a, the two chassis such as 32, are made integral by very rigid upper cross pieces 33. More precisely, the chassis are slightly offset in the longitudinal direction of a row, so that two crankshafts should not be opposite one another and the beaters actuated by one should not strike the beaters actuated by the other.

The details in section, in FIG. 7b show that the chassis 32 rests on rollers 35 movable rotatively about the longitudinal cross pieces 36 of the transporter 34 which, by a transversal movement of the chassis, enables the slight irregularities in the alignment of the rows of vine stocks or deviations of the carrying tractor to be overcome. The end of course abutments (not shown) prevent the chassis from escaping on the side of the straddling transporter.

The method of fixing the assembly formed by the chassis 32 and the double transporter 34 to the carrying tractor, is shown in FIG. 8. A plate 37 provided with ties 37a, is articulated on a vertical shaft 38 mounted on two ties 39a, provided on the side of a tractor 39, between the forward and rear wheels of the latter. This plate is made rigid on its two vertical edges by the angle irons 40 extended upward by the ears 41. The connecting rods 42 are articulated by their extremities on these ears by means of the axles 43.

The double straddling transporter 34 is mounted so that it can rock at the other end of the connecting rods in the following way: the two legs of the transporter which are located on the side of the tractor are articulated by their lower extremities at the end of the lower connecting rods 42. The upper extremities of these legs are provided with a finger 44 which can move in a longitudinal opening 44a provided at the end of each of these upper connecting rods 42.

Such a method of attachment has several degrees of freedom enabling the necessary adjustments to be made to the carriage:
  it can oscillate about the axle 38 which, in combination of the transversal movement of the chassis in the double transporter 34 facilitates the adjustment to which reference has already been made;
  it can be regulated vertically by means of the articulated parallellogram formed by the rigidity giving angle pieces 40, the vertical legs of the double transporter 34 located on the side of the tractor and the connecting rods 42. The carriage can thus be adjusted to the height of the vines to be harvested,
  lastly, it can be regulated transversally, in a rocking movement, by means of the openings provided in the upper connecting rods 42, which enables the carriage to be maintained in a vertical position, when the vines are planted on a sloping ground.

Figure 9:
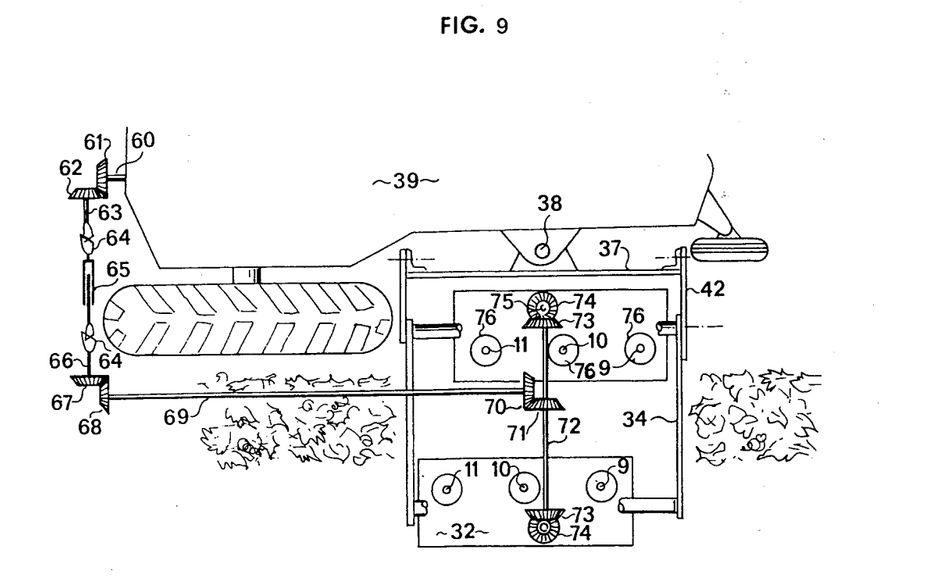
FIG. 9 is a schematic plan view of an embodiment of the driving means carriage according to FIG. 8.

FIG. 9 schematically represents a plan view of an embodiment of the mechanisms driving the crankshafts of the carriage. Onto the shaft 60 of the power take off of the tractor 39 is keyed a toothed conical pinion 61 engaging with a pinion of the same type 62, itself keyed onto the end of a shaft 63 which is mounted on bearings (not shown) fixed on the tractor 39. By means of two universal joints 64 fixed on one hand to each extremity of a telescopic shaft 65 and, on the other hand, one to the free end of the shaft 63 and the other to an extremity of the shaft 66, the pinion 62 is made integral with a toothed conical pinion 67 keyed onto the end of the shaft 66. This pinion, in its turn, engages with a pinion of the same type 68 keyed onto the end of a shaft 69. The two shafts 66 and 69 are mounted on bearings (not shown) fixed on the double straddling transporter 34. At the other extremity of the shaft 69 is keyed a toothed conical pinion 70 which engages with a pinion of the same type 71 mounted on bearings (not shown) integral with the double transporter 34 and along the axis of which slides a fluted shaft 72. To each extremity of this fluted shaft, mounted on bearings (not shown) fixed to the chassis 32, is keyed a toothed conical pinion 73 which engages with a pinion of the same type 74 keyed to the end of the shaft 75 controlling the crankshafts. Onto this control shaft is also keyed a toothed wheel (not shown) connected by a chain to a toothed wheel 76 mounted at the end of each of the crankshafts 9, 10 and 11.

The rotary movement of the power take off shaft 60 of the tractor 39 is thus transmitted by the mechanisms 61 to 76 decribed above, to the crankshafts 9, 10 and 11, whatever the positions:

of the double transporter 34 with respect to the tractor 39, of the chassis 32 in the double transporter 34.

Thus, the oscillating movements of the carriage about the shaft 38 fixed to the tractor, the vertical adjustment movement on the connecting rods 42, the transversal rocking movement in the openings made in the two upper connecting rods 42, are "made good" by the telescopic shaft 65 and the universal joints 64 and the transversal movement of the chassis 32 in the double transporter 34 is made possible by the sliding fitting of the pinion 71 and the fluted shaft 72.

Figure 10:
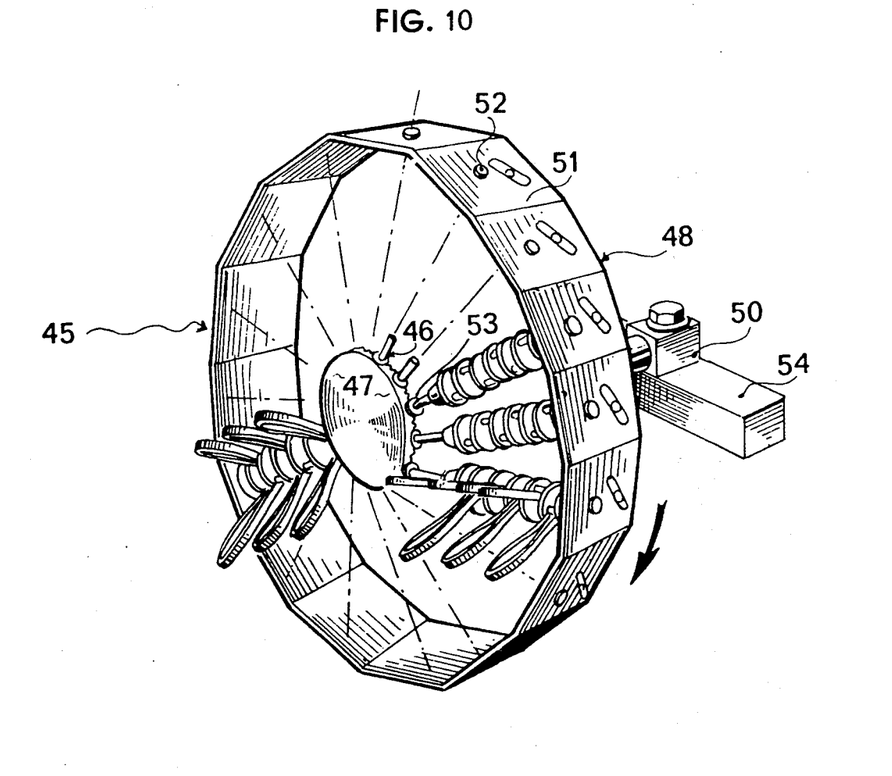
FIG. 10 shows a second embodiment of a chassis fitted with beaters.

FIG. 10 shows another embodiment, more elaborate this time, of an assembly 45 in the form of a cone, the apex of which is located on the side exposed to the rows of vines.

Although the construction and operation of the shafts carrying the beaters and the crankshafts are the same as those previously described, this embodiment differs from the first in that the crankshafts are arranged in the form of a star, from the apex to the periphery of the cone, inside a chassis 48, movable rotatively about its axis on a fixed shaft 50 and comprising a facet skirt 51.

Each of these shafts 53 is mounted:

on one part and by its exterior extremity in a bearing 52 provided in one of the facets 51 and, on the other hand and by its other extremity against a toothed conical crown hub 47. A planet gear 46 mounted on the shaft 53 and integral with it engages with the crown 47.

The assembly 45 is supported by a beam 54 on which is fastened the shaft 50 supporting the hub 47.

The assembly 45 is rotated by means of an appropriate transmission which drives the chassis 48 about the shaft 50 and the pinion 47.

Thus the rotary movement is transmitted to the crankshafts by means of the planet gears 46.

Figure 11:
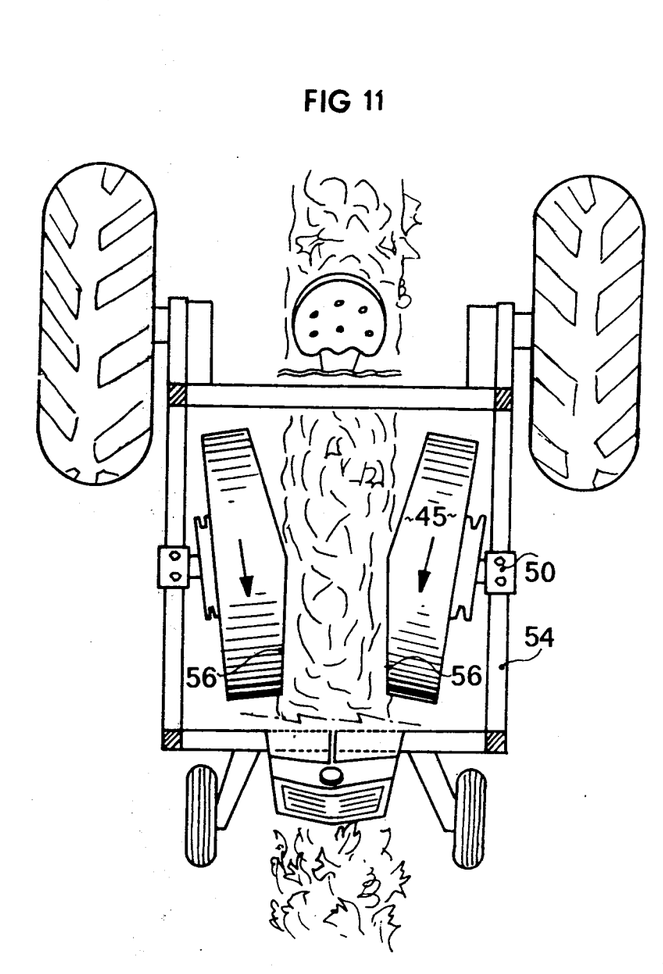
FIGS. 11 and 12 show respectively a plan view and a transversal section, a carriage of two assemblies according to FIG. 10 in the harvesting position, on a straddling tractor.
Figure 12:
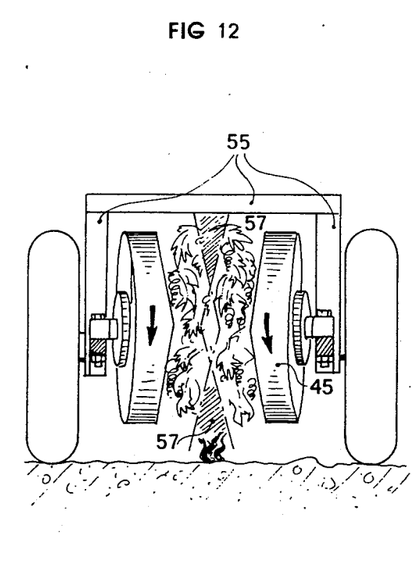

A harvesting carriage, shown in FIGS. 11 and 12, comprises two assemblies such as 45, opposite one another, in order to be placed on both sides of a row of vines V and connected to one another by a transporter 55, in fact, constituted by the chassis of a straddling tractor.

As in the case of FIG. 8, this carriage is usefully located between the forward and the rear wheels of the tractor so that the conductor is able to supervise the quality of his work.

The two components 45 of this carriage are arranged in a manner such that in one of the genetrices 56 of each of the cones is parallel to the vine stock plane which certainly has the effect of pushing aside the other genetrices from the plants to be harvested and thus to diminish the penetration of the corresponding beaters.

This genetrix can be vertical and the vine is then submitted to the same action in depth of the beaters over the entire height of the latter.

It is preferable, however, that it should be horizontal. In that case, as FIG. 12 shows, it is the beaters situated in a plane vertical to the periphery of the cone which penetrate less deeply into the interior of the vine. But this disadvantage is insignificant as the areas 57, where the beaters are less engaged, correspond to the base and top of the vine stock, that is, the areas where there are no or few grapes.

Figure 13:
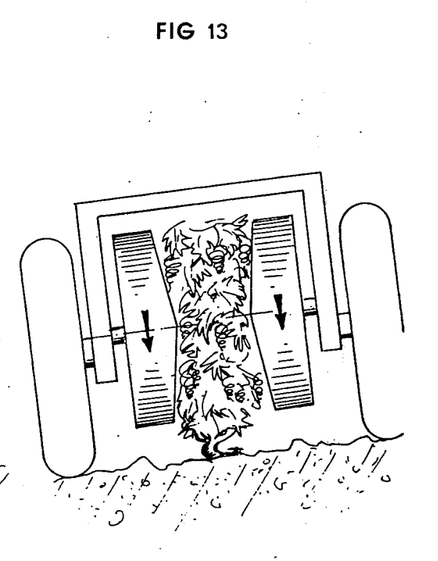
FIG. 13 shows the position which these assemblies assume when the harvesting is carried out on a sloping ground.

On the other hand, this arrangement has an important advantage illustrated in FIG. 13. In case the tractor is inclined with respect to the vine stock plane — this is the case where a vineyard is on a sloping ground — the cones can oscillate on the horizontal genetrices without damaging the vines and without appreciably diminishing the harvest.

The mode of action of an individual beater has been described in detail with reference to FIGS. 1 to 3. It is evidently the same when the beater is mounted in a battery with other beaters in an assembly as is shown in FIGS. 5 and 9. The beaters rely on the same set of crankshafts and in turn give the bunches of grapes a sudden stroke detaching the grapes.

The grapes fall into a conventional collector connected by a telescopic spout to a pump driven by the power take off of the tractor. They are thus collected as the tractor advances along the rows of vines.

To adjust the elasticity of the beaters to the grapes to be picked, it is evidently possible to vary the type of strap used, by altering the thickness of the band used for this purpose or the nature of:

the rubber of which it is composed, or the fabric reinforcment, but it is also possible, within a certain range, to adjust this elasticity by inserting a wedge of appropriate thickness between the two extremities of the strap, inside the stirrup 2 which holds them.

It will be understood that the elasticity will be all the weaker, the thicker the wedge that is used and thus the two extremities of the strap will be wider apart.

Figure 14:
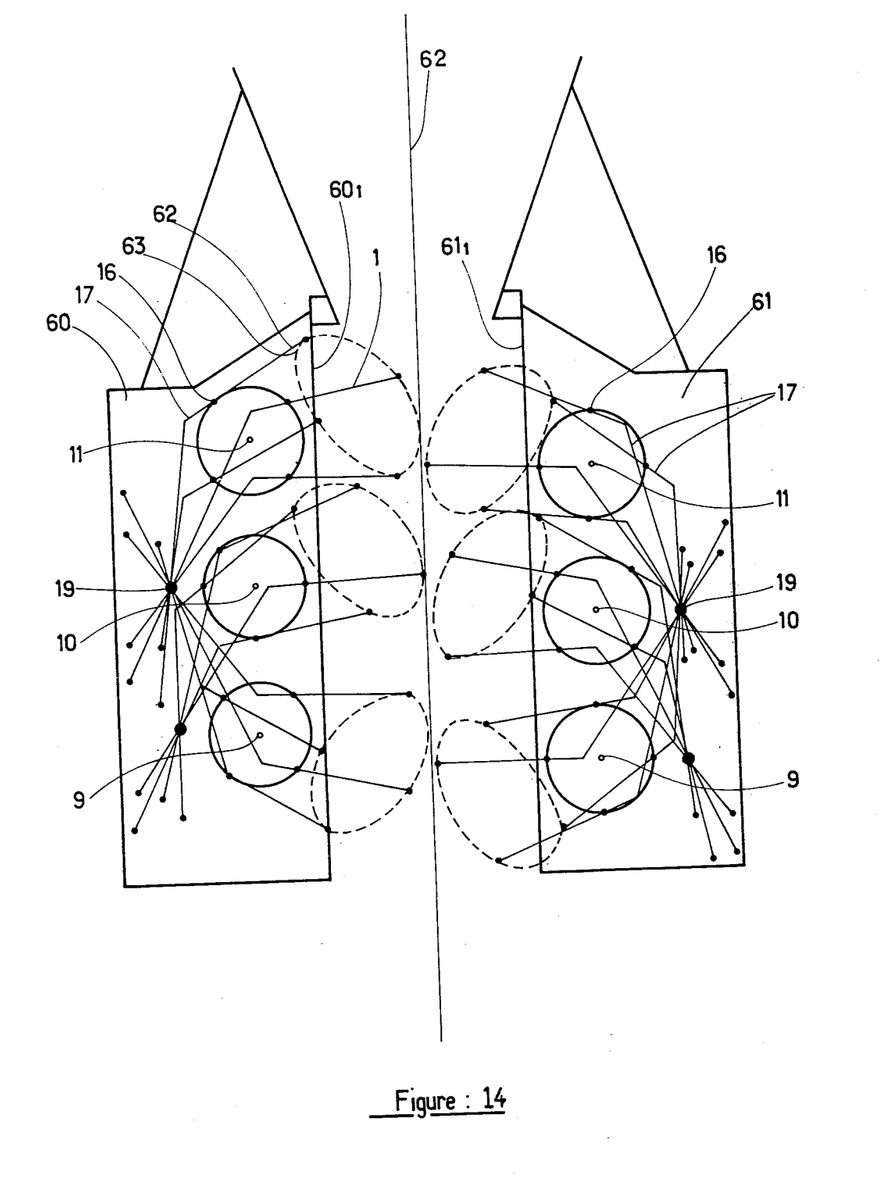
FIG. 14 is a schematic plan view of another embodiment of a machine according to the invention.

The grape harvesting machine of the invention shown in FIG. 14 consists of a chassis (not shown) on which are fixed two units 60 and 61 facing one another by their open edge $60_1$ and $61_1$. This machine is designed to be placed astride a row of vines, as shown schematically at 62, so that the units 60 and 61 are placed laterally to this row of vines.

Inside each of these units are the crankshafts 9, 10, 11, provided with crank pins 16 which pivotally hold the arms 17. Each of the arms 17 are mounted slidingly in a sleeve and the assembly of these sleeves is mounted orientably along a vertical shaft 19, placed in each of the units 60 and 61.

It is seen therefore that when the crankshafts 9, 10 and 11 rotate, the arms 17 pivoting at 16 slide inside the sleeves carried by the vertical shaft 19 in a manner such that the extremity of these arms 17, provided with a beater 62, moves along the trajectories 63 to penetrate the row of vines during the movement of the machine in order to detach the grapes from their bunches.

FIG. 15 thus shows a vane 62 fixed by the bolts 62 to the extremity of the arm 17, which latter is mounted pivotally on the crank pin 16.

This arm 17 penetrates moreover into the interior of the sleeve 64 which latter is mounted orientably on the axle 19.

In accordance with the invention, the beater 62 is made of a vane of resilient material, such as synthetic rubber, including if necessary a fabric reinforcment, this vane being relatively thick and comprising a central opening 65, arranged perpendicularly to the plane in which the beater moves, which plane is defined by the trajactory 63 or the plane in which the arms 17 move.

It is then seen that, because of this perforation perpendicular to the plane in which the vane moves, the latter is given an axial and lateral rigidity necessary to perform its work on the vines.

In the example shown in FIGS. 17 and 18, this central opening 65, perpendicular to the plane in which a vane moves, is obtained by making several perforations 66, of circular form, which are connected to one another by the grooves 67 to form an opening 65 extending appreciably along the whole length of the vane 62.

As will be noted in the attached drawings, the circular openings 66 and the grooves 67 are of different thickness and also the vane 62 has a triangular form of which the large base 68 is placed on the side of the extremity 69 of the vane designed to be fixed to the free extremity of the arm 17.

In addition, this vane 62 is made of a substantial thickness so as to act over an appreciable thickness against the grapes in order not to crush them.

Thus, preference is given to making the vane 62 of a thickness such that the free extremity 70 has a width and a height that are appreciably identical and thus a cross section which is square.

On account of this construction, when the vane penetrates laterally into a row of vines, it is able to deform itself, as is shown in FIG. 4, when it meets a sufficiently strong branch 71 of a vine.

Thus in that case, the two edges 72 and 73 of the vane 62 have a tendency to move away from one another without offering too much resistance and this resistance does not increase considerably as the vane penetrates laterally into the vine.

Thus, in that case, it is the two areas 74 and 75 which become deformed when bearing on the branch 71.

On the other hand, when the vane moves longitudinally to the trajectory of the machine or longitudinally to the row of vines, the vane can bend in a manner shown in FIG. 5 when it encounters lateral resistance resulting, for example, from its lateral application against the branch 72. In that case, it is seen that the two sides 72 and 73 have a tendency to become offset with respect to one another, the branch 72 having a tendency to contract in the direction of its length, while the branch 73 has a tendency to lengthen so that the internal edges 76 defined by the grooves 67, can lodge inside the circular half opening 77 located opposite.

Thus, in this construction, the lateral deformation of the vane is determined essentially by the modification of the length of the of the two sides 72 and 73 and this resistance tends to increase only when the edge 76 of the grooves 67 is applied to the bottom of the circular opening 77 placed opposite.

These different degrees of lateral resilience ensure that the grapes become detached while enabling the vane to move inside the vine by pushing aside weak branches but deforming itself when the resistance becomes too great.

Of course, the invention is not limited to the examples of its embodiment herein above described and illustrated and on the basis of which other modes and forms of embodiment can be envisaged, without departing from the scope of the invention.

We claim:

1. A beater apparatus for harvesting grapes comprising an elongated body, said elongated body formed of a vane of resilient material having at least one longitudinal opening, and means for driving said elongated body in a substantially elliptical movement, said opening of the vane is made by several perforations connected by grooves having a width smaller than the perforations.

2. A beater apparatus according to claim 1 with said perforations of different dimensions.

3. A beater apparatus according to claim 1 in which the perforations of the vane are circular.

4. A grape harvesting machine for harvesting grapes, said machine comprising a chassis, support means for the chassis, at least one crankshaft mounted on the chassis by means of bearings, means for rotating said crankshaft, crank pins mounted on said crankshaft, beaters formed of resilient material mounted on said crank pins, arms mounted articulatedly on the crank pins of the crankshafts, said beaters fixed to the extremity of said arms, and pivoting sleeves mounted on the chassis in which a portion of said arms are slidingly retained.

5. A machine according to claim 4 in which the sleeves are mounted pivotally on an axis of the chassis parallel to the crankshaft.

6. A machine according to claim 4, in which the sleeves receive slidingly the extremities of the arms not provided with beaters, these arms moreover, being mounted articulatedly on an intermediate point along their length on the crank pins of the crankshafts.

7. A machine according to claim 4 in which the crank pins of the crankshafts receive articulatedly, the extremities of the arms not provided with beaters, these arms, moreover, being mounted articulatedly on an intermediate point along their length on the sleeves.

8. A machine according to claim 5, in which means are provided to move the oscillation axis of the arm in translatory movement.

9. A grape harvesting machine for harvesting grapes, said machine comprising a chassis, support means for the chassis, at least one crankshaft mounted on the chassis by means of bearings, means for rotating said crankshaft, crank pins mounted on said crankshaft, beaters formed of resilient material mounted on said crank pins, said crankshafts being disposed radially about and axis delimiting a cone, and means for driving said crankshafts rotatively about themselves and the axis.

10. A machine according to claim 9, in which the cone delimited by the crankshafts has a horizontal genetrix parallel to the row of vines.

* * * * *